(12) United States Patent
Nilsson

(10) Patent No.: US 9,614,639 B2
(45) Date of Patent: Apr. 4, 2017

(54) POWER CONTROL OF OPTICAL SIGNALS HAVING DIFFERENT POLARIZATIONS

(75) Inventor: Alan C. Nilsson, Mountain View, CA (US)

(73) Assignee: Infinera Corporation, Sunnyvale, CA (US)

(*) Notice: Subject to any disclaimer, the term of this patent is extended or adjusted under 35 U.S.C. 154(b) by 371 days.

(21) Appl. No.: 12/567,458

(22) Filed: Sep. 25, 2009

(65) Prior Publication Data

US 2011/0076020 A1 Mar. 31, 2011

(51) Int. Cl.
  *H04B 10/564* (2013.01)
  *H04J 14/06* (2006.01)
  *H04B 10/077* (2013.01)
  *H04J 14/02* (2006.01)
(52) U.S. Cl.
  CPC .......... *H04J 14/06* (2013.01); *H04B 10/0775* (2013.01); *H04J 14/02* (2013.01); *H04B 2210/075* (2013.01)
(58) Field of Classification Search
  USPC .................................................. 398/65, 197
  See application file for complete search history.

(56) References Cited

U.S. PATENT DOCUMENTS

| | | | | |
|---|---|---|---|---|
| 7,136,546 B2 * | 11/2006 | Kish et al. | ....................... | 385/14 |
| 7,539,365 B2 * | 5/2009 | Welch et al. | ................... | 385/14 |
| 7,787,778 B2 * | 8/2010 | Harley et al. | ................ | 398/195 |
| 8,155,533 B2 * | 4/2012 | Nakamoto | .................... | 398/184 |
| 2003/0016413 A1 * | 1/2003 | Carrick et al. | ................ | 359/124 |
| 2008/0232816 A1 * | 9/2008 | Hoshida et al. | ............. | 398/152 |
| 2010/0080571 A1 * | 4/2010 | Akiyama et al. | ............ | 398/184 |

* cited by examiner

*Primary Examiner* — Shi K Li
(74) *Attorney, Agent, or Firm* — David L. Soltz

(57) ABSTRACT

Consistent with an aspect of the present disclosure, an optical communication apparatus is provided that transmits a WDM signal including a plurality of optical channels, wherein each channel has a corresponding one of a plurality of wavelengths. Each of the plurality of optical channels includes optical signals having first (e.g., TE) and second (e.g., TM) polarizations. In one example, each polarized optical signal is modulated in accordance with an identifying tone. The optical channels are combined onto a waveguide, and an optical tap connected or coupled to the waveguide supplies a portion of the WDM signal including a composite of the optical channels to a photodiode. The aggregate power received by the photodiode includes the power associated with each optical channel, and the power of each channel is the sum of the powers of individual polarized optical signals within that channel. The photodiode converts the received WDM portion including the polarized optical signal portions into corresponding electrical signals. A processor circuit demodulates the electrical signals, identifies the tones, and determines a modulation depth for each tone. Based on the modulation depth, a ratio of the optical powers of one polarized optical signal to another can be calculated, and the optical powers of one or both of the polarized optical signals in each channel can be adjusted so that the optical power ratio has a desired value, e.g., a value substantially equal to one. Thus, one tap and one photodiode may be provided to monitor each polarized optical signal within each WDM channel, thereby reducing costs and yielding a simpler system design.

16 Claims, 9 Drawing Sheets

POWER CONTROL OF OPTICAL SIGNALS HAVING DIFFERENT POLARIZATIONS

DESCRIPTION OF THE INVENTION

Background

Wavelength division multiplexed (WDM) optical communication systems are known in which multiple optical signals, each having a different wavelength, are combined onto a single optical fiber. Such systems typically include transmitters having a laser associated with each wavelength, a modulator configured to modulate the output of the laser, and an optical combiner to combine each of the modulated outputs. Receivers are also provided to demultiplex the received WDM signal into individual optical signals, convert the optical signals into electrical signals, and output the data carried by those electrical signals.

Conventionally, WDM systems have been constructed from discrete components. For example, demultiplexer and photodiodes have been packaged separately and provided on a printed circuit board. More recently, however, many WDM components, have been integrated onto a single chip, also referred to as a photonic integrated circuit (PIC).

In order to further increase the data rates associated with WDM systems, each channel within a WDM system includes two optical signals having the same wavelength but different, preferably orthogonal, polarizations. For example, one such signal may have a transverse electric (TE) polarization while the other has a transverse magnetic (TM) polarization. Typically, each polarized signal within a given WDM channel is combined with other polarized signals associated with other WDM channels onto an optical communication path, such as an optical fiber.

In order to optimize system performance, the optical power associated with each WDM channel is preferably substantially the same. In addition, the polarized signals within each channel preferably have substantially the same power. Otherwise, if one optical signal has substantially less power than the other within a given channel, the lower power signal may be substantially degraded due to losses, for example, within the system. System performance is typically gauged based on the signal-to-noise and/or bit error ratio (BER) of the signal having the lowest power. Accordingly, if one signal within the system is impaired, the overall system performance is reduced.

Accordingly, the optical power of each polarized signal within WDM channel should preferably be monitored so that appropriate power adjustments can be made. If access to each polarized signal was available, the power of each polarized signal may be monitored before it is combined with other optical signals onto an optical fiber. With this approach, however, monitoring components, such as an optical tap and a photodiode, for example, may be required for each polarized optical signal. In high capacity systems including a relatively large number of WDM channels, a significant number of such monitoring components may be required, thereby increasing system cost and complexity.

Thus, there is a need for an optical communication system in which the power of polarized optical signals is monitored and adjusted with a minimum number of components.

SUMMARY

In accordance with the present disclosure, an optical communication apparatus is provided that includes a waveguide configured to carry first and second optical signals. The first optical signal is modulated at a first frequency corresponding to a first tone, and the second optical signal is modulated at a second frequency corresponding to a second tone. The first and second optical signals are further modulated at a third frequency corresponding to a rate at which data is carried by the first and second optical signals. The first optical signal is polarized to have a first polarization and the second optical signal is polarized to have a second polarization. The first and second optical signals have the same wavelength, and the first and second frequencies are less than the third frequency. The optical communication apparatus also includes an optical tap coupled to the waveguide. The optical tap is configured to supply a portion of the first optical signal and a portion of the second optical signal. A photodiode is also provided that is configured to receive the first and second optical signal portions and generate first and second electrical signals. The first electrical signal includes a first spectral component associated with the first tone and a second spectral component associated with the second tone. Further, a processor circuit is provided that is configured to receive the first electrical signal and the second electrical signal and generate a control signal based on the first and second spectral components, such that a power level associated with the first optical signal is adjusted in response to the control signal.

Consistent with an additional aspect of the present disclosure, a method is provided that includes a step of receiving a first optical signal carried by an optical communication path, and a step of receiving a second optical signal carried by the optical communication path, the first and second optical signals having first and second polarizations, respectively. The first and second optical signals have the same wavelength. The method further includes determining a value of a first parameter associated with a modulation of the first optical signal and determining a value of a second parameter associated with a modulation of the second optical signal. In addition, the method includes the steps of determining a value of a third parameter indicative of a power of at least one of the first and second optical signals, and adjusting the power of the at least one of the first and second optical signals based, at least in part, on the value of the first parameter and the value of the second parameter.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the present disclosure.

BRIEF DESCRIPTION OF THE DRAWINGS

FIGS. 5a and 5b illustrate exemplary plots of power vs. time for TE and TM polarized optical signals, respectively;

DESCRIPTION OF THE EMBODIMENTS

Consistent with an aspect of the present disclosure, an optical communication apparatus is provided that transmits a WDM signal including a plurality of optical channels, wherein each channel has a corresponding one of a plurality of wavelengths. Each of the plurality of optical channels includes optical signals having first (e.g., TE) and second (e.g., TM) polarizations. In one example, each polarized optical signal is modulated in accordance with an identifying tone. The optical channels are combined onto a waveguide, and an optical tap connected or coupled to the waveguide supplies a portion of the WDM signal including a composite of the optical channels to a photodiode. The aggregate power received by the photodiode includes the power associated with each optical channel, and the power of each channel is the sum of the powers of individual polarized optical signals within that channel. The photodiode converts the received WDM portion including the polarized optical signal portions into corresponding electrical signals. A processor circuit demodulates the electrical signals, identifies the tones, and determines a modulation depth for each tone. Based on the modulation depth, a ratio of the optical powers of one polarized optical signal to another can be calculated, and the optical powers of one or both of the polarized optical signals in each channel can be adjusted so that the optical power ratio has a desired value, e.g., a value substantially equal to one. Thus, one photodiode and one photodiode may be used to monitor all the WDM channels and their corresponding polarized optical signals, thereby reducing costs and yielding a simpler system design.

Reference will now be made in detail to the present exemplary embodiments of the present disclosure, examples of which are illustrated in the accompanying drawings. Wherever possible, the same reference numbers will be used throughout the drawings to refer to the same or like parts.

Figure 1:
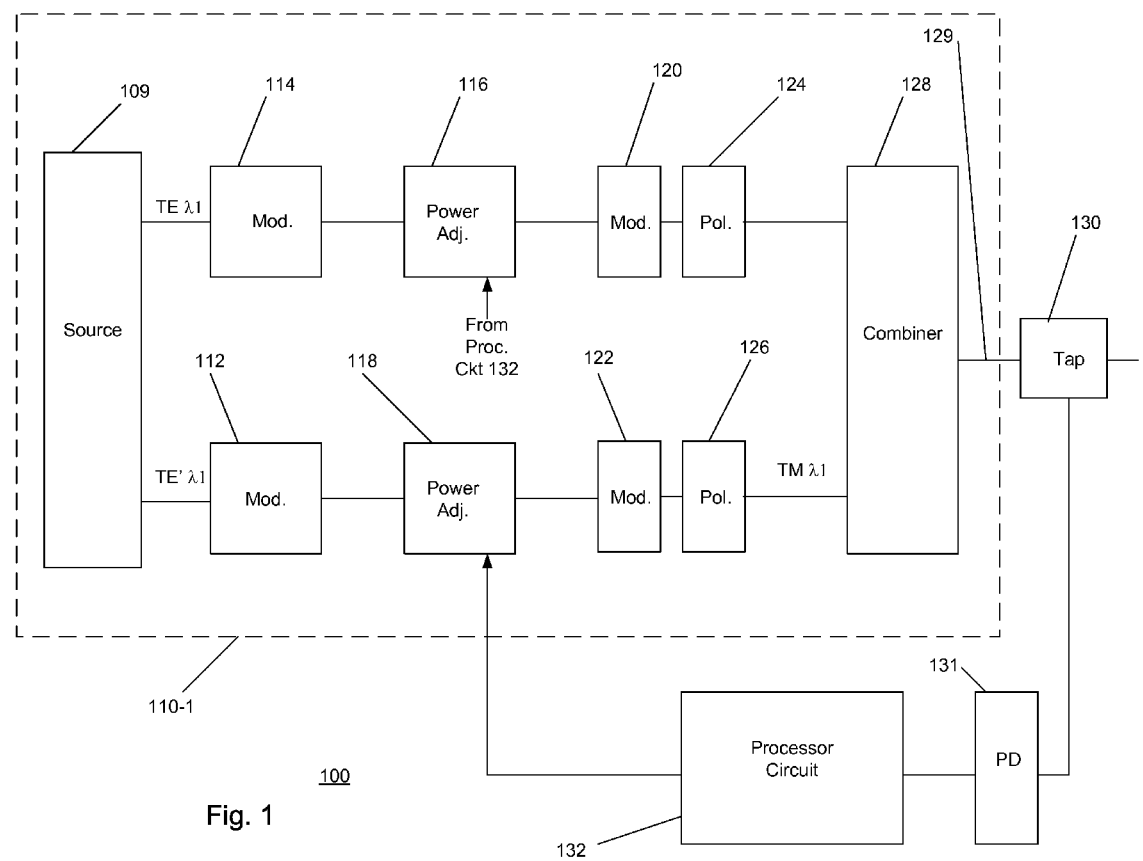
FIG. 1 illustrates a block diagram of an optical transmitter consistent with an aspect of the present disclosure.

FIG. 1 illustrates an example of an optical transmitter 100 consistent with an aspect of the present disclosure. Optical transmitter 100 includes a transmitter block 110-1 that includes an optical source 109, that supplies light or optical signals TE$\lambda$1 and TE'$\lambda$1 that typically has a given polarization, such as a transverse electric (TE) polarization. Signals TE$\lambda$1 and TE'$\lambda$1 typically have a given wavelength, e.g., $\lambda$1.

Signals TE$\lambda$1 and TE'$\lambda$1 are often continuous wave (CW) signals when output from source 109, but may be supplied to modulators 114 and 112, respectively, so that both signals are modulated to carry data at a bit rate, for example, of 10 or 2.5 Gbit/second. In addition, these signals are typically modulated in accordance with a known format, such as a differential quadrature phase shift keying (DQPSK) format. Suitable modulators may include Mach-Zehnder modulators and electro-absorption modulators and are further described in U.S. patent application Ser. No. 12/345,315 "High Capacity Transmitter Implemented On A Photonic Integrated Circuit," the contents of which are incorporated herein by reference.

The modulated optical outputs from modulators 114 and 112 are next supplied to power adjustment circuitry 116 and 118, respectively. Such power adjustment circuitry may include, for example, a variable optical attenuator, a photodiode (e.g., a PIN photodiode, as discussed in US Application Publication No. 20050084202, the entire contents of which are incorporated herein by reference), semiconductor optical amplifier, Mach-Zehnder modulator, or an electro-absorption modulator (EAM). Components suitable for use in power adjusting circuits 116 and 118 are discussed in greater detail in U.S. Pat. Nos. 7,079,715 and 7,539,365, the entire contents of both of which are incorporated herein by reference. Power adjusting circuits 116 and 118 adjust a value of the power or the power levels of TE$\lambda$1 and TE'$\lambda$1 based on control signals from processor circuit 132, which is discussed in greater detail below.

Power adjusted optical signals TE$\lambda$1 and TE'$\lambda$1 are next supplied to modulators 120 and 122, respectively, that further modulate these signals with tones having frequencies (measured in Hz), which are typically less than the bit rates (expressed in Hz) at which data is carried by the optical signals. For example, optical signal TE$\lambda$1 may be modulated at a first relatively low frequency (for example, less than 1 MHz) corresponding to a first tone, and TE'$\lambda$1 may be modulated at a second relatively low frequency, (also less than 1 MHz, for example) corresponding to a second tone. The first and second tones, or tags, are typically different from one another so that each may be identified or differentiated from one another.

The tone modulated optical signals TE$\lambda$1 and TE'$\lambda$1 are next fed to polarizers 124 and 126, respectively. Polarizer 124 filters light having any extraneous polarizations other than a TE polarization so that the output therefrom (TE$\lambda$1) is maintained at the TE polarization. Polarizer 126, however, rotates the incoming light (TE'$\lambda$1) so that it is in an orthogonal polarization state to TE$\lambda$1. For purposes of description, this orthogonal polarization state is referred to here as transverse magnetic (TM) polarization, as indicated by the designation TM$\lambda$1 in FIG. 1. Adjustments in the power of optical signal TE'$\lambda$1, therefore, result in corresponding adjustments in power of TM$\lambda$1. Optical signals TE$\lambda$1 and TM$\lambda$1, output from polarizers 124 and 126, respectively, are supplied to optical combiner 128, which combines these orthogonally polarized optical signals onto a waveguide 129.

A splitter or optical tap 130 supplies a portion of the optical signals TE$\lambda$1 and TM$\lambda$1, each having wavelength $\lambda$1 but a respective polarization, to photodiode 131. It is noted that the polarization of optical signals TE$\lambda$1 and TM$\lambda$1 may change prior to reaching optical tap 130. Photodiode 131 converts the received TE$\lambda$1 and TM$\lambda$1 optical signal portions into corresponding electrical signals, which are fed to a processor circuit 132. As described in greater detail below, based on spectral components included in the electrical signals, processor circuit 132 determines a ratio of the power levels of the TE$\lambda$1 and TM$\lambda$1 optical signal, determines whether the ratio has a desired value, and, if not, supplies control signals to at least one of power adjusting circuits 116 and 118 so that the desired power ratio is obtained. It is noted that other optical components may be provided between combiner 128 and tap 130. For convenience, such optical components are not shown in FIG. 1.

Figure 2:
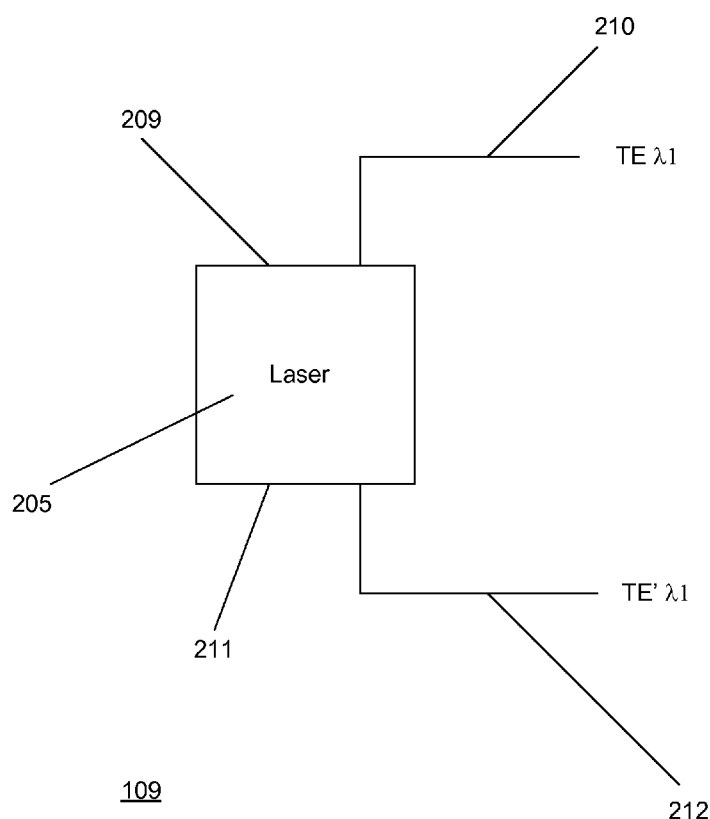
FIG. 2 illustrates an example of an optical source consistent with an aspect of the present disclosure.

FIG. 2 illustrates an example of source 109 in greater detail. Here, source 109 includes a laser 205, which has first and second output ports or sides 209 and 211 that receive light, for example, from opposite sides of laser 205. TE$\lambda$1 and TE'$\lambda$1 are output from ports or sides 209 and 211, respectively, and are supplied to waveguides 210 and 212, respectively. Waveguides 210 and 212, in turn, supply TE$\lambda$1 and TE'$\lambda$1 to modulators 114 and 112, respectively.

Figure 3A:
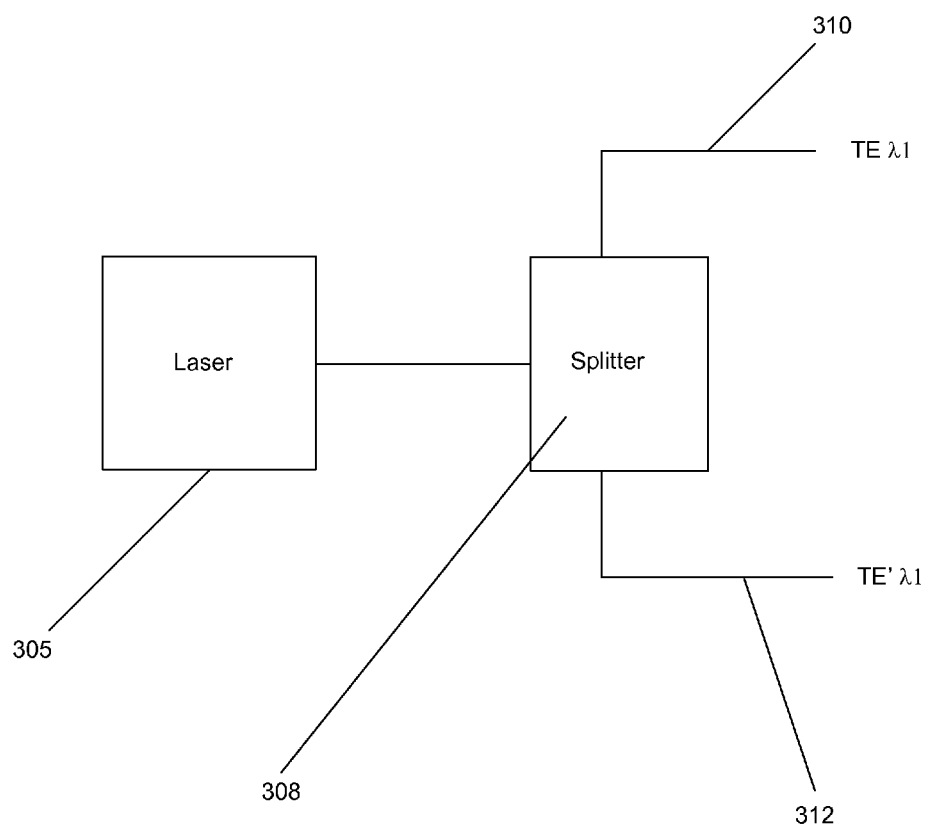
FIG. 3a illustrates an alternative optical source consistent with an additional aspect of the present disclosure.

In the example shown in FIG. 3a, laser 305 supplies light to an optical power splitter 308, which has output waveguides 310 and 312. Waveguides 310 and 312 supply optical signals TEλ1 and TE'λ1 to modulators 114 and 112, respectively.

Figure 3B:
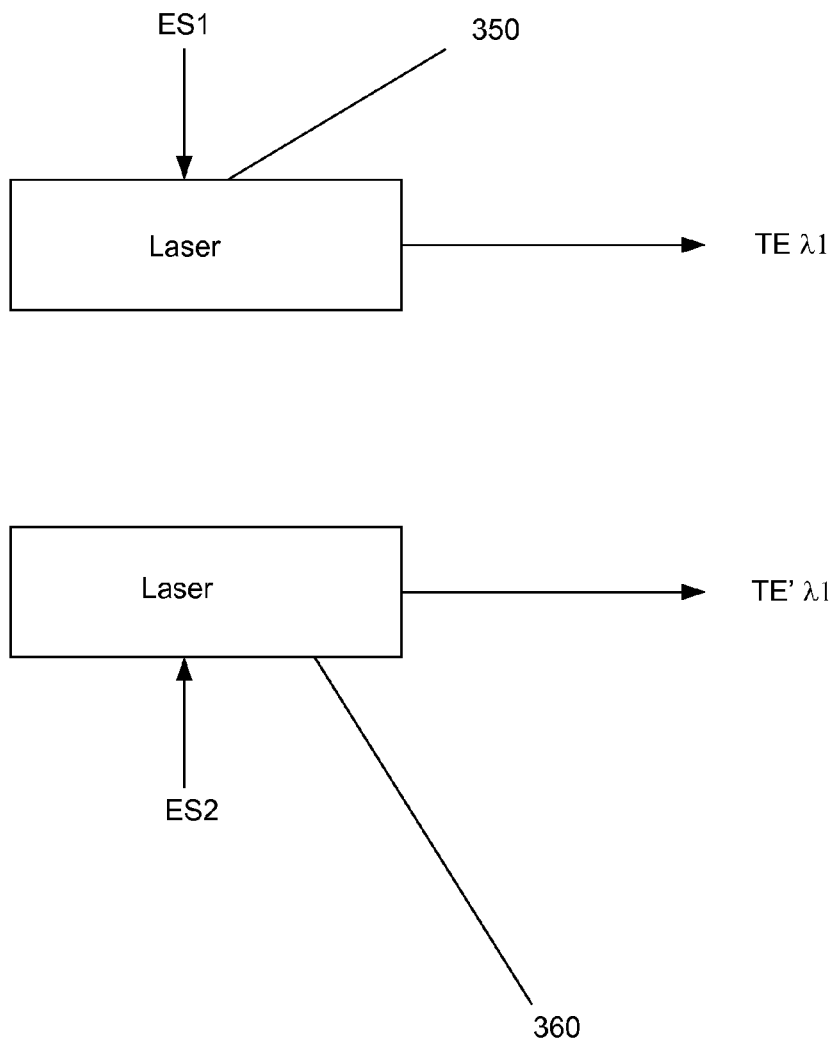
FIG. 3b illustrates another example of an optical source consistent with the present disclosure.

In FIG. 3b, signals ES1 and ES2 directly modulate lasers 350 and 360, respectively, to generate optical signals TEλ1 and TE'λ1. Signals ES1 and ES2 may have a frequency adequate to modulate the optical output of lasers 350 and 360 with an identifying tone, similar to the tones described above.

Figure 4:
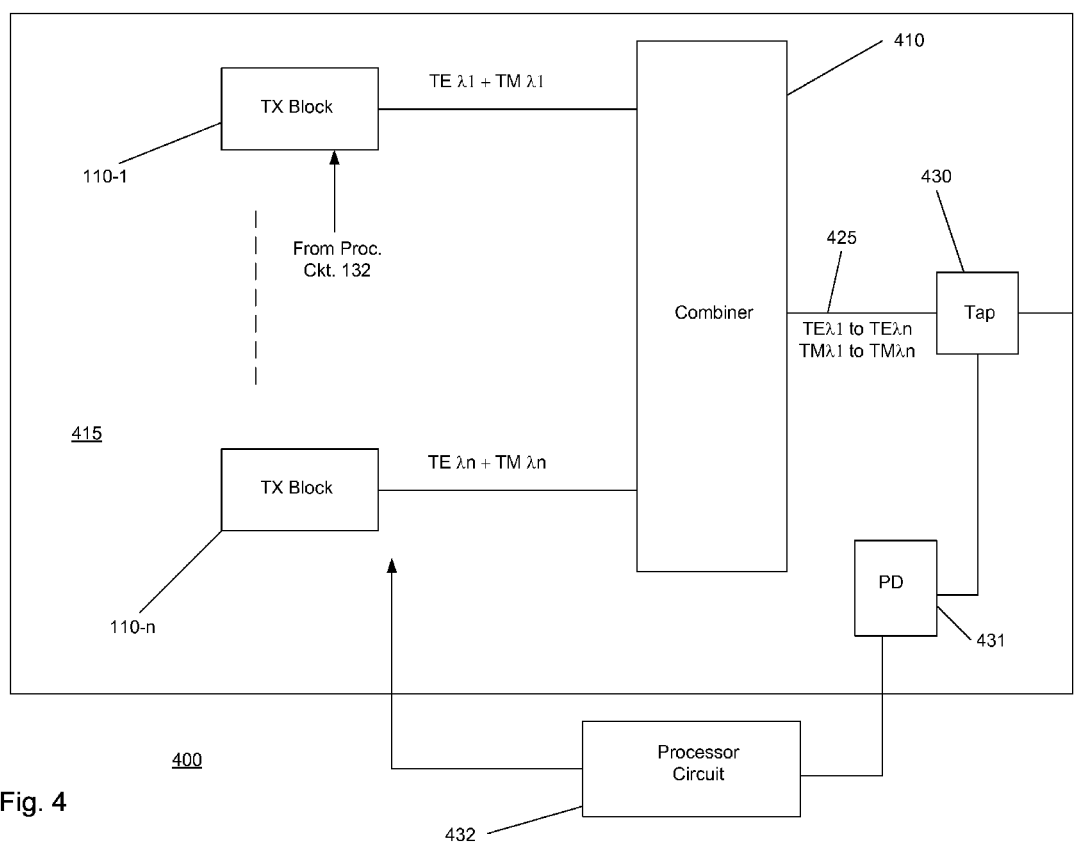
FIG. 4 illustrates an example of an optical communication apparatus consistent with a further aspect of the present disclosure.

FIG. 4 illustrates communication apparatus 400 including a plurality of transmission blocks 110-1 to 110-$n$, each of which supplies a corresponding one of a plurality of optical channels, and each optical channel having a corresponding one of a plurality of wavelengths (λ1 to λn). As noted above, each optical channel includes first and second optical signals having the same wavelength (e.g., λ1) but may have orthogonal polarizations, such that, for example, transmission block 110-1 outputs optical signals TEλ1 and TMλ1 and transmission block 110-$n$ outputs optical signals TEλn and TMλn.

The outputs from each of transmission blocks 110-1 to 110-$n$ are combined onto optical path 425 by an optical combiner 410 to form a wavelength division multiplexed (WDM) signal. Combiner 410 may include an arrayed waveguide grating (AWG), for example, and optical path 425 may include a waveguide that feeds the WDM signal to optical tap 130. Optical tap 430 is similar to tap 130 discussed above and supplies a portion of the WDM signal to photodiode 431, which, in turn, supplies corresponding electrical signals to processor circuit 432.

As further shown in FIG. 4, transmission blocks 110-1 to 110-$n$, combiner 410, tap 430, and photodiode 431 may be provided on a common substrate 415, including silicon or indium phosphide (InP), for example.

Each polarized optical signal is preferably modulated with a unique identifying tone in a manner similar to that discussed above, and the electrical signals output from photodiode 431 include spectral components associated with each tone. As a result, processor 432 can determine a power level associated with each tone and polarized optical signal, and supply control outputs or signals to each of transmission blocks 110-1 to 110-$n$ to adjust the optical signal power levels in a manner similar to that discussed above.

A method for monitoring and adjusting the power levels of each polarized optical signal will next be described with reference to flow chart 500 in FIG. 5a, as well as plots 550 and 560 shown in FIGS. 5b and 5c, respectively.

As noted above, each polarized optical signal may be modulated in accordance with a unique tone. Such modulation causes a variation, as a function of time, in the optical power associated with the optical signal. Accordingly, as shown in FIG. 5a, the optical power associated with optical signal TEλ1, for example, may be represented by plot 550 shown in FIG. 5b. Here, the optical power of optical signal TEλ1 varies as a sinusoid or spectral component about an average power P0TE. The amplitude of the sinusoid or modulation depth is represented by ΔPTE. The average power P0TE is related to the modulation depth ΔPTE by the following formula:

ΔPTE=μTE*P0TE, where μTE is a constant referred to as an optical modulation index.

Figure 5A:
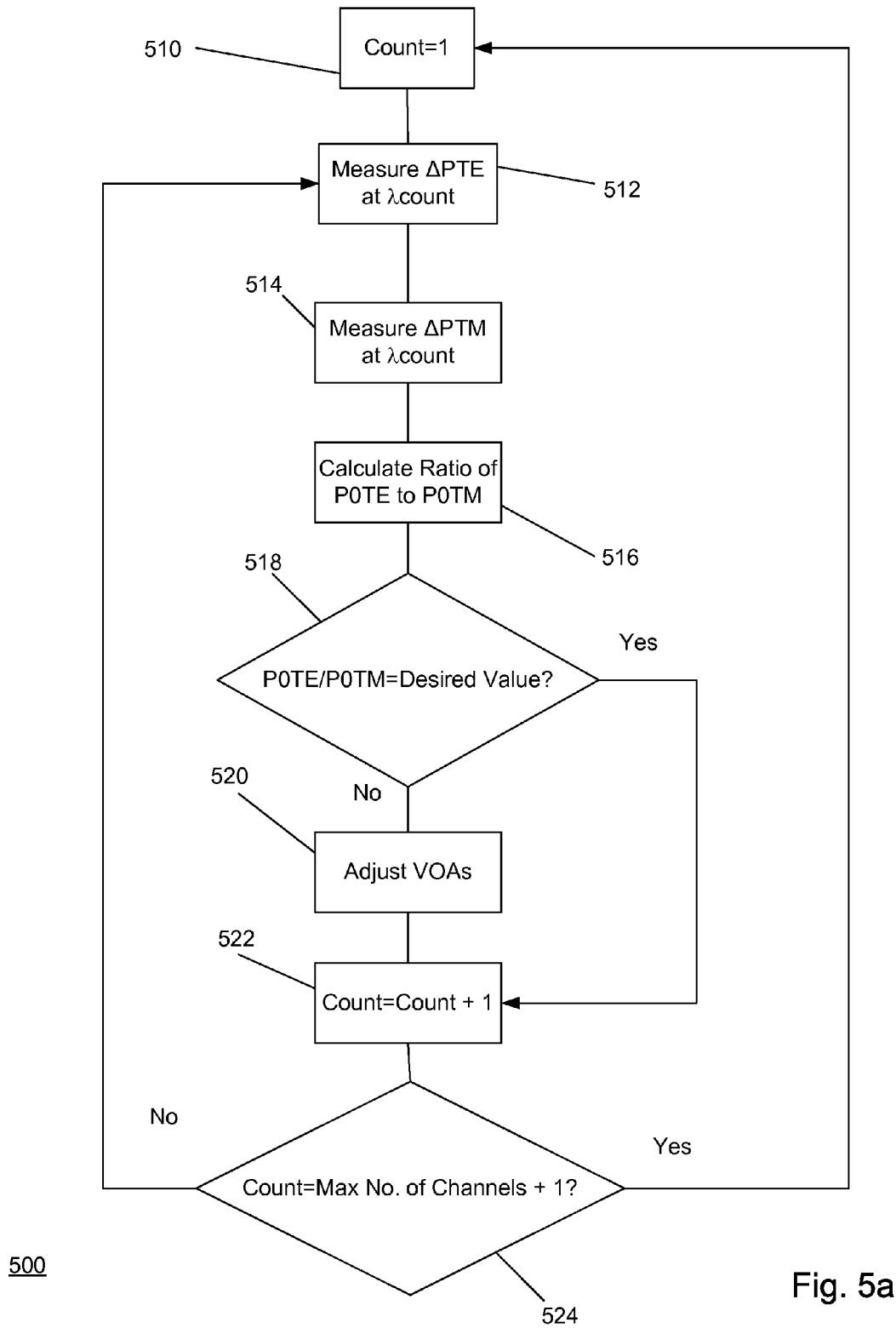
FIG. 5a illustrates a flow chart in connection with a method that is consistent with an additional aspect of the present disclosure.
Figure 5B:
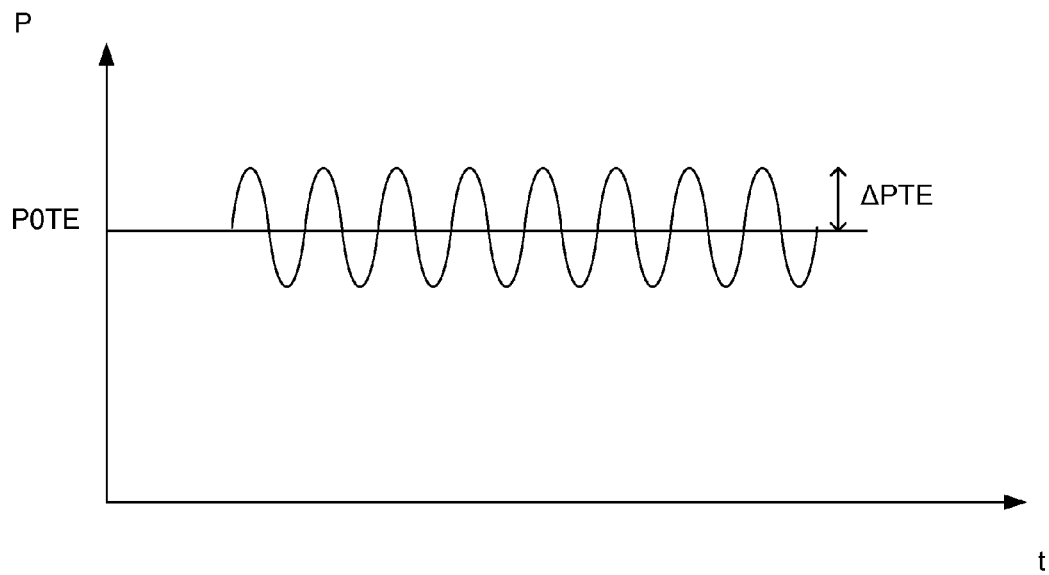
Figure 5C:
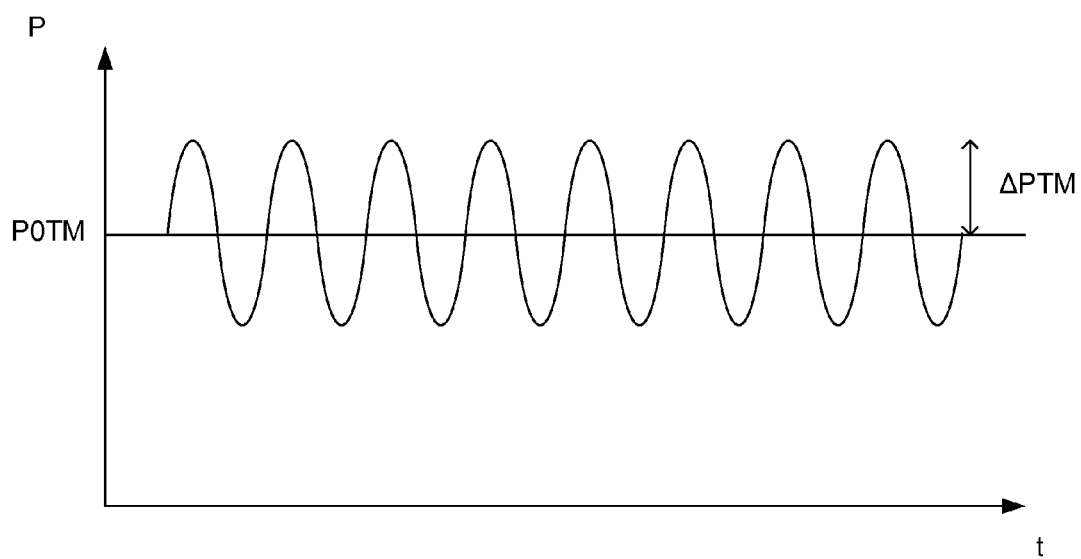

Likewise, the optical power associated with optical signal TMλ1, for example, may be represented by plot 560 shown in FIG. 5c, whereby the optical power of optical signal TMλ1 varies as a sinusoid or spectral component about an average power P0TM. The modulation depth is represented by ΔPTM, and the average power P0TM is related to the modulation depth ΔPTM by the following formula:

ΔPTM=μTM*P0TM, where μTM is a constant.

Thus, assuming that the ratio of μTE and μTM is unity or otherwise a fixed ratio (typically both modulation depths are constant), a ratio of P0TE to P0TM may be obtained by dividing ΔPTE by ΔPTM. In particular:

P0TE/P0TM=(ΔPTE/ΔPTM)*(μTM/μTE)

The calculated ratio of P0TE/P0TM can be compared to a desired ratio, and power adjustments can be made accordingly, so that the desired ratio of average optical powers is obtained. Such power monitoring and adjustment is similarly performed for each polarized optical signal associated with each optical channel.

In greater detail with reference to FIG. 5a, a method for monitoring and adjusting optical signal power levels may begin with an initial step (510), in which processor 432 may set a wavelength or channel counter variable ("Count"). This count designation indicates that the power levels are to be measured and adjusted for polarized, preferably orthogonally polarized, signals associated with a first optical channel (e.g., λ1). In step 512, a value of a first parameter, such as modulation depth ΔPTE is measured or determined based on the electrical signals output from photodiode 431, for example. Photodiode 431 supplies a current, which may be converted to a voltage with a known transimpedance amplifier, for example. The photocurrent, and corresponding voltage, associated with each polarized signal will vary in accordance with the tone. In step 514, a value of a second parameter, such as modulation depth ΔPTM is measured or determined based on such voltage. Next, in step 516, a ratio of P0TE to P0TM, for example, may be calculated based on ΔPTE and ΔPTM, as noted above. If the calculated ratio of P0TE to P0TM is equal to a desired value (or substantially equal to it) in step 518, Count is incremented in step 522 to indicate that the above power measurement and adjustment steps are to be performed for polarized optical signals of another channel (wavelength, e.g., λ2). On the other hand, if the ratio of P0TE to P0TM is not equal to a desired value, then control signals are sent to one or both of power adjusting circuits, such as 112 and 118, in a corresponding transmission block (e.g., transmission block 110-1) to adjust the power levels of the optical signals supplied thereto and to therefore obtain a desired value of a ratio of P0TE to P0TM. In one example, the power adjustment circuits, e.g., 116 and 118, include variable optical attenuators (VOAs) which have an attenuation that can be adjusted or varied in response to the control signals or outputs from processor circuit 432. It is noted that processor circuit 132 discussed above may operate in a similar fashion as 432 to adjust the optical power level or average optical power levels of TEλ1 and TMλ1.

If Count exceeds the maximum number of channels (step 524), then Count may be reset (step 510), and the steps shown in FIG. 5a may be repeated for channel beginning with the first channel having wavelength λ1.

Figure 6:
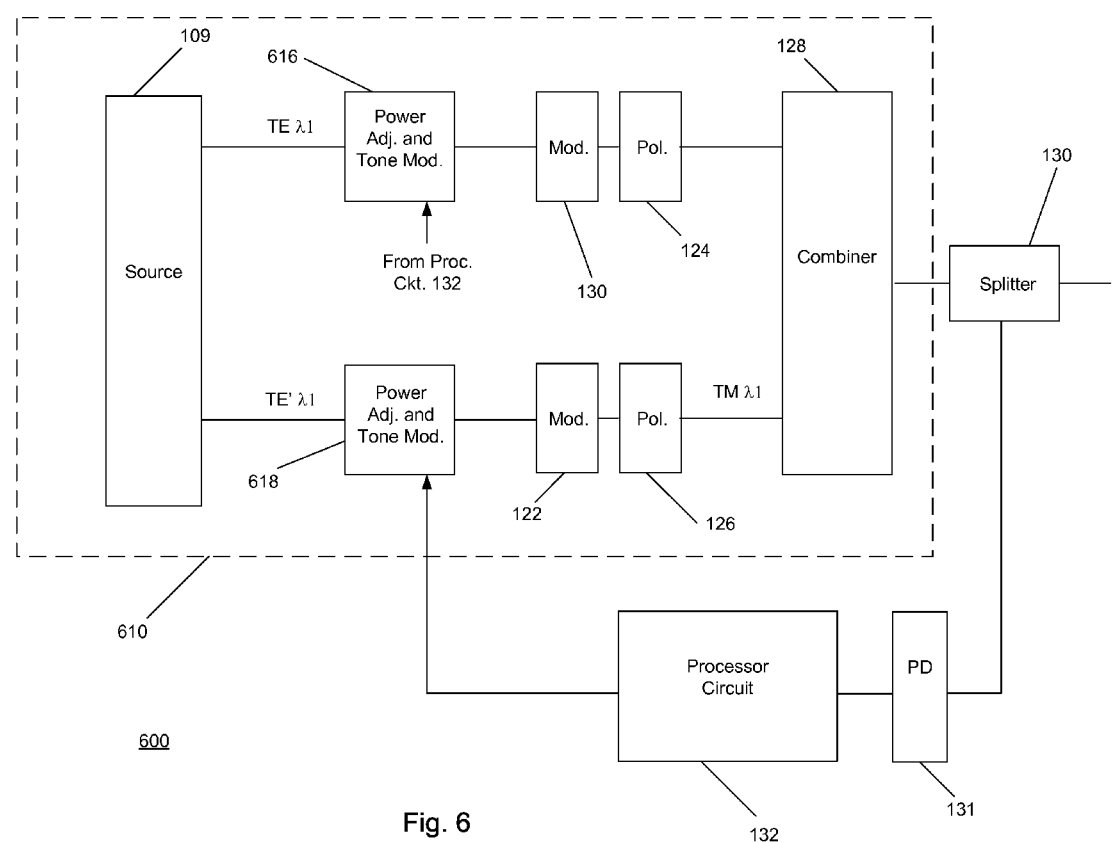
FIG. 6 illustrates a further example of an optical communication apparatus consistent with an aspect of the present disclosure.

FIG. 6 illustrates an alternative example including transmission block 610. Here, one component (616 or 618) may be used to modulate and regulate the power of an incoming optical signal (e.g., TEλ1 or TE'λ1). A variable optical attenuator, semiconductor optical amplifier, Mach-Zehnder modulator, electro-absorption modulator, or photodiode, such as a PIN photodiode, may be used as power adjustment and tone modulators 616 and 618.

Figure 7:
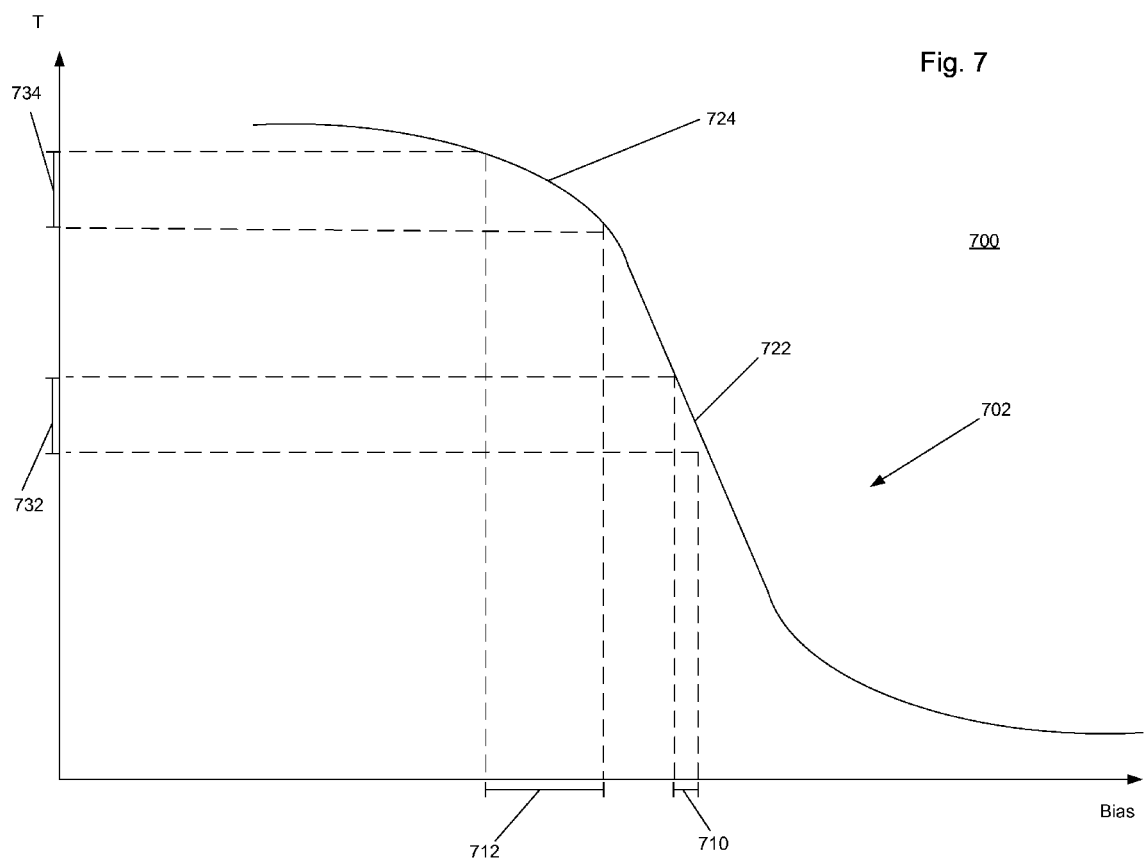
FIG. 7 illustrates a plot of transmission vs. applied bias for a variable optical attenuator consistent with the present disclosure.

FIG. 7 illustrates transfer function 702 associated with one possible type of power adjustment and tone modulator 610. For convenience, in discussing FIG. 7, it is assumed that power and tone modulator 610 is a VOA. As generally understood, the output power (T) through a VOA is a function of a bias applied to the VOA. That function, or transfer function, is typically not linear, as shown in FIG. 7. In particular, as further shown in FIG. 7, certain portions of the transfer function, e.g., portion 722, are relatively steep compared to flatter portions, such as portion 724.

If the VOA is to be used for both power adjustment and tone modulation, a particular bias is applied to the VOA so that a particular average optical power is output from the VOA. In order to produce tone modulation of the optical power, the bias is varied so as to yield a corresponding variation in the output power and produce, for example, a sinusoidal modulation of the optical power emerging from the VOA. For example, if the bias is varied within range 710 in FIG. 7, the output powers vary over a corresponding range of powers 732. Thus, since transfer function 702 is relatively steep for biases within range 710 (note portion 722), the magnitude of range 710 is selected to be relatively small.

On the other hand, if the bias is shifted so that more optical power is desired to be transmitted through the VOA, the bias voltage may reduced to be within range 712. Since the corresponding portion 724 of transfer function 702 is relatively flat, the bias voltage must be varied over a greater range (see range 712) in order to yield a variation in optical power that varies over a range 734 having substantially the same optical modulation depth as was associated with range 732. Otherwise, if the modulation depth of induced optical power variation changes with average bias and hence average attenuation, changes in detected tone strength may be attributed to such changes in bias instead of changes in the optical average power levels of the polarized optical signals, such as TEλ1 and TMλ1. Accordingly, under such circumstances, the power levels of the polarized optical signals may not be adequately adjusted to a desired level.

In summary, a system and related method have been described to monitor and adjust the power of optical signals having different polarizations but the same wavelength in a WDM system.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical communication apparatus, comprising:
a first modulator, which is configured to receive and modulate a first optical signal at a first frequency corresponding to a first tone, the first modulator outputting a modulated first optical signal;
a second modulator, which is configured to receive and modulate a second optical signal at a second frequency corresponding to a second tone, the second modulator outputting a modulated second optical signal, the first and second tones being different;
a waveguide configured to receive the modulated first and second optical signals, the modulated first and second optical signals carrying data at a bit rate, the modulated first optical signal being polarized to have a first polarization and the modulated second optical signal being polarized to have a second polarization, the modulated first optical signal having a wavelength and the modulated second optical signal having said wavelength, the bit rate, as measured in Hz, being greater than the first and second frequencies, as measured in Hz;
an optical tap coupled to the waveguide, the optical tap being configured to supply a portion of the modulated first optical signal and a portion of the modulated second optical signal;
a photodiode configured to receive first and second optical signal portions and generate first and second electrical signals, the first electrical signal including a first spectral component associated with the first tone and a second spectral component based on the second tone;
a processor circuit configured to receive the first electrical signal and the second electrical signal and generate a control signal based on the first and second spectral components, such that a power level associated with the modulated first optical signal is adjusted by a first variable optical attenuator in response to the control signal, wherein the control signal is a first control signal and the power level is a first power level, the processor circuit further being configured to generate a second control signal based on the first and second spectral components, such that a second power level associated with the second optical signal is adjusted by a second variable optical attenuator in response to the second control signal;
the first variable optical attenuator being coupled to the processor circuit, the first variable optical attenuator receiving first continuous wave (CW) light and supplying attenuated first light as the first optical signal to the first modulator, such that the first variable optical attenuator is configured to adjust the first power level based on the first tone; and
the second variable optical attenuator being coupled to the processor circuit, the second variable optical attenuator receiving second CW light and supplying attenuated second light as the second optical signal to the second modulator, such that the second variable optical attenuator configured to adjust the second power level based on the second tone.

2. An optical communication apparatus in accordance with claim 1, further including:
a power adjustment circuit coupled to the processor circuit, the power adjustment circuit being configured to adjust the power level in response to the control signal.

3. An optical communication apparatus in accordance with claim 1, further including a laser, the laser having a first output side and a second output side, the first output side supplying light associated with the first optical signal, and the second output side supplying light associated with the second optical signal.

4. An optical communication apparatus in accordance with claim 1, further including:
a laser; and
an optical splitter, the splitter having an input for receiving an optical output from the laser, and first and second outputs, the first output supplying a first portion of the optical output from the laser as the first CW light that is supplied to the first variable optical attenuator and is associated with the first optical signal, and the second output supplying a second portion of the optical output from the laser as the second CW light that is supplied to the second variable optical attenuator and is associated with the second optical signal.

5. An optical communication apparatus in accordance with claim 1, wherein the modulator is coupled to the processor circuit and is further configured to adjust the power level of the first optical signal in response to the control signal.

6. An optical communication apparatus in accordance with claim 1, wherein each of the first and second modulators includes a Mach-Zehnder modulator.

7. An optical communication apparatus in accordance with claim 1, wherein each of the first and second modulators includes an electro-absorption modulator (EAM).

8. An optical communication apparatus in accordance with claim 1, wherein each of the first and second modulators includes a photodiode.

9. An optical communication apparatus in accordance with claim 8, wherein the photodiode include a PIN photodiode.

10. An optical communication apparatus in accordance with claim 1, wherein each of the first and second modulators includes a semiconductor optical amplifier (SOA).

11. An optical communication apparatus in accordance with claim 1, further including a substrate, the waveguide, photodiode and optical tap being provided on the substrate.

12. A method, comprising:
supplying a first continuous wave (CW) optical signal to a first modulator;
modulating the first optical signal with the first modulator to impart a first tone to the first optical signal;
outputting the first optical signal from the first modulator;
supplying a second CW optical signal to a second modulator;
modulating the second optical signal with the second modulator to impart a second tone to the second optical signal, the first tone being different from the second tone;
outputting the second optical signal from the second modulator, the first and second optical signals having first and second polarizations, respectively, the first optical signal having a wavelength and the second optical signal having the same wavelength;
combining the first and second optical signals having the first and second polarizations onto a waveguide;
tapping a portion of the first optical signal and a portion of the second optical signal from the waveguide;
determining a value of a first parameter associated with a modulation of the first optical signal and the portion of the first optical signal tapped from the waveguide;
determining a value of a second parameter associated with a modulation of the second optical signal and the portion of the second optical signal tapped from the waveguide;
determining a value of a third parameter indicative of a power of at least one of the first and second optical signals; and
adjusting the power of said at least one of the first and second CW optical signals input to the first and second modulators, respectively, based, at least in part, on the value of the first parameter and the value of the second parameter, wherein the first and second parameters are based on the first and second tones, respectively.

13. A method in accordance with claim 12, wherein the wavelength is a first wavelength, the method further including:
receiving third and fourth optical signals carried by an optical communication path, the third and fourth optical signals having the first and second polarizations, respectively, the third optical signal having a second wavelength and the second optical signal having the second wavelength;
determining a value of a fourth parameter associated with a modulation of the third optical signal;
determining a value of a fifth parameter associated with a modulation of the fourth optical signal;
determining a value of a sixth parameter indicative of a power of at least one of the third and fourth optical signals; and
adjusting the power of said at least one of the third and fourth optical signals based, at least in part, on the value of the third parameter and the value of the fourth parameter.

14. A method in accordance with claim 12, wherein the first parameter is a modulation depth of the first optical signal and the second parameter is a modulation depth of the second optical signal.

15. A method in accordance with claim 13, wherein the first parameter is a modulation depth of the first optical signal, the second parameter is a modulation depth of the second optical signal, the fourth parameter is a modulation depth of the third optical signal, and the fifth parameter is a modulation depth of the fourth optical signal.

16. A method in accordance with claim 12, wherein the adjusting the power of said at least one of the first and second optical signals is based, at least in part, on a ratio of the value of the first parameter to the value of the second parameter.

* * * * *